(12) United States Patent
Ericson et al.

(10) Patent No.: US 8,854,970 B2
(45) Date of Patent: Oct. 7, 2014

(54) FLOW CONTROL CA ALLOCATION CORRECTION FACTOR BASED ON SCHEDULING POLICY, MOBILITY, LOAD OR RADIO CHANNEL TYPE

(75) Inventors: Mårten Ericson, Luleå (SE); Hans Hannu, Luleå (SE); Min Wang, Luleå (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 102 days.

(21) Appl. No.: 13/576,125

(22) PCT Filed: Feb. 2, 2010

(86) PCT No.: PCT/SE2010/050127
§ 371 (c)(1),
(2), (4) Date: Jul. 30, 2012

(87) PCT Pub. No.: WO2011/096856
PCT Pub. Date: Aug. 11, 2011

(65) Prior Publication Data
US 2012/0300636 A1    Nov. 29, 2012

(51) Int. Cl.
*H04L 12/26* (2006.01)
*H04J 1/16* (2006.01)
*G08C 15/00* (2006.01)
*G06F 11/00* (2006.01)
*G01R 31/08* (2006.01)

(52) U.S. Cl.
USPC ............ 370/235; 370/236; 370/252; 455/403

(58) Field of Classification Search
USPC .......... 370/229–235, 252–310; 455/403–436, 455/509–511
See application file for complete search history.

(56) References Cited

U.S. PATENT DOCUMENTS 7,688,731 B2 * 3/2010 Haumont et al. ............. 370/235
8,000,249 B2 * 8/2011 Nagy et al. .................... 370/236
(Continued)

FOREIGN PATENT DOCUMENTS

WO   WO 2007/085949 A2   8/2007
WO   WO 2008/041032 A2   4/2008
(Continued)

OTHER PUBLICATIONS

International Search Report, Application No. PCT/SE2010/050127, Oct. 21, 2010.
(Continued)

*Primary Examiner* — Man Phan
(74) *Attorney, Agent, or Firm* — Myers Bigel Sibley & Sajovec, P.A.

(57) ABSTRACT

The present invention relates to a method and an arrangement in a communication network node (15) of achieving an optimal use of a scheduler buffer for a given user equipment (18) communicating with said first communication network node (15). Said communication network node (15) comprising a flow control entity (83) adapted to control the flow of data in respect of said given mobile terminal (18) between a second communication network node (10) and said first communication network node (15) in a communication network system. The method comprises the step of providing, to a capability allocation message used for controlling the flow of data in respect of said given mobile terminal (18) between said second compensation network node (10) and said first communication network node (15) in said communication network system, a first compensation factor based on at least one of: scheduling policy, mobility, load and radio channel type.

11 Claims, 7 Drawing Sheets

(56) References Cited

U.S. PATENT DOCUMENTS

| | | | |
|---|---|---|---|
| 8,605,592 B2* | 12/2013 | Nadas et al. | 370/235 |
| 2005/0239435 A1* | 10/2005 | Ikeda et al. | 455/403 |
| 2007/0015525 A1* | 1/2007 | Beming et al. | 455/509 |
| 2010/0062777 A1* | 3/2010 | Nadas et al. | 455/445 |
| 2010/0238803 A1* | 9/2010 | Racz et al. | 370/235 |

FOREIGN PATENT DOCUMENTS

| | | |
|---|---|---|
| WO | WO 2008/041032 A3 | 4/2008 |
| WO | WO 2008/066429 A1 | 6/2008 |
| WO | WO 2009/025592 A1 | 2/2009 |

OTHER PUBLICATIONS

Kazmi et al., "Scheduling Algorithms for HS-DSCH in a WCDMA Mixed Traffic Scenario", *The 14th IEEE 2003 International Symposium on Personal, Indoor and Mobile Radio Communication Proceedings*, 2:1485-1489, Sep. 7, 2003.

Mutairi et al:, "Impact of Iub Flow Control on the Proportional Fair Scheduler in HSDPA", *First IFIP Wireless Days*, 2008, IEEE, pp. 1-6, Nov. 24, 2008.

Nádas et al., "HSUPA Transport Network Congestion Control", *EURASIP Journal on Wireless Communications and Network*, vol. 2009, Article ID 924096, Aug. 11, 2009.

Communication with Supplementary European Search Report, EPO Application No. 10845352.3, Sep. 16, 2013.

\* cited by examiner

FLOW CONTROL CA ALLOCATION CORRECTION FACTOR BASED ON SCHEDULING POLICY, MOBILITY, LOAD OR RADIO CHANNEL TYPE

CROSS REFERENCE TO RELATED APPLICATION

This application is a 35 U.S.C. §371 national stage application of PCT International Application No. PCT/SE2010/050127, filed on 2 Feb. 2010, the disclosure and content of which is incorporated by reference herein in its entirety. The above-referenced PCT International Application was published in the English language as International Publication No. WO 2011/096856 A1 on 11 Aug. 2011.

TECHNICAL FIELD

The present invention relates to a method and arrangement in a communication network node, in particular to an arrangement for achieving an optimal use of a scheduler buffer for a given user equipment communicating with said first communication network node as well as a method for such achievement.

BACKGROUND

In a communication network system such as the UMTS terrestrial radio access network (UTRAN), there are two potential bottlenecks, namely, the air interface and the transport network (TN or Iub) (transport link) connecting the radio network controller (RNC) and NodeB. The transport link between the RNC and NodeB is a potential bottleneck when its capacity is smaller then the available maximal capacity of the UMTS Air Interface (Uu). For example, a typical scenario is that the NodeB is connected to the RNC through an E1 link with a capacity of approximately 2 Mbps, and in this case the available Uu capacity for the high speed downlink packet access (HSDPA) may be significantly larger than 2 Mbps. This means that a single user equipment (UE) with good radio conditions can overload the transport network (TN).

The fair sharing of Uu resources is the task of the Uu scheduler, but the Uu scheduler can not cope with the TN bottleneck, i.e. the transport link bottleneck. In order to deal with the TN bottleneck a flow-control (FC) mechanism has been introduced. The goal of the FC is to efficiently use the TN through ensuring that the TN resources are used well while keeping low frame loss and low delay in the TN.

Lack of FC causes serious performance degradation when the transport network or the air interface is the bottleneck. In this case the TN buffer is typically full, causing high TN delay and loss ratio. This causes exhaustive radio link control (RLC) retransmissions which results in a much lower throughput.

In current HSDPA systems both uplink (UL) and downlink (DL) can provide higher throughput compared to ancestor systems, like GSM, and EDGE. Features including shared channel transmission, high order modulation, fast radio link adaptation, and channel dependency scheduling etc can guarantee higher data rate and system throughput in the DL air interface.

However, in some scenarios there may be an unbalance between the transport interface and the air interface. For example, the transport network interface is limiting if the transport interface is only 1 or 2 E1/TI based, and, the air interface may also be limiting if the transport interface is a very good wired based connection. The even more likely scenario is when the air interface limitation and transport interface limitation are mixed. The air interface throughput is fluctuating because the radio quality depends on the user equipment (UE) mobility. Hence, it is very necessary to have flow control (FC).

FC located in NodeB interacts through Iub Frame Protocol messages (capability allocation (CA) control frame messages) with the MAC-d function in the RNC. A well designed FC algorithm will guarantee the Iub resources to be used efficiently while keeping a low frame loss and delay over the Iub interface. To guarantee an efficient utilization of the air resources, the FC entity ensures that the priority queue (PQ) (i.e. the scheduler buffer length for a user UE in the NodeB) is short enough when Uu is bad, and ensures that the PQ is long enough when Uu is good. Often only non-guaranteed bit rate (non-GBR) flows, i.e. flows that can suffer packet loss and delay under congestion, are flow controlled.

The HSDPA FC entity, located in NodeB, makes sure that there is a good balance between Iub and Uu interface, and exchanges the CA control frames between the NodeB and SRNC. High resource utilization should be guaranteed no matter either side interface is limited.

A state of the art FC algorithm adjusts the CA per MAC-d PDU flow. As already mentioned the FC ensures the PQ, i.e. the scheduler buffer length for a UE in the NodeB, to be short enough with small CA when Uu is bad, and ensures the PQ to be long enough with large CA when Uu is good. When the Uu is bad a handover may be evident which would empty the PQ during handover, which causes the data that are not transmitted yet, to be lost, so that it has to be retransmitted by higher layer protocols, e.g. RLC. When the Uu is good the data rate over the Uu may be so high that the PQ can not offer enough bits to be transmitted over the Uu and thus the user throughput is lower than it should as the user data bits resides too long in the RLC SDU buffer. Hence, the FC is highly important for the system performance.

A simplified illustration of flow control as applied in a communication network system such as the UMTS terrestrial radio access network (UTRAN), is illustrated by FIG. 6. In order to achieve an optimal use of a scheduler buffer PQ in NodeB for a given user equipment $UE_i$ communicating with NodeB, CA for user i is sent to the RNC via the Iub interface, transport network, requesting the amount of data to be sent in a later predefined period. The requested data for user i is then sent from the RNC data buffer, via the Iub interface, transport network, to the NodeB PQ. The NodeB PQ provides data to the given user equipment $UE_i$ communicating with said NodeB as an over-air transmission using the Uu interface, air interface.

PQT (the time to serve PQ by NodeB scheduler) may be one input to indicate Uu congestion. The Data Frame loss or Delay over Iub are used to measure TN congestion. The PQT is estimated via an algorithm. However, sometimes the PQT is overestimated, which result in that the PQ runs empty, i.e. not enough bits are requested from the RLC SDU buffer, thus the CA is to low. But, sometimes the PQT is underestimated, CA too large, which may result in an increased RLC retransmission rate or temporary RLC window stalling.

FIG. 3 and FIG. 4 demonstrates the comparison results between a max Channel Quality Indicator (maxCQI) scheduler and Round Robin (RR) scheduler in terms of PQT deviation and the PQ nonempty ratio.

The positive value of PQT deviation means that the PQ is overestimated and the negative value of the PQT deviation means that the PQ is underestimated. From the C.D.F. graph in FIG. 3, it can be seen that the maxCQI scheduler has higher PQ estimation variation, and also higher probability to overestimate the PQ than the RR scheduler, i.e. a higher probability of the PQ running empty. An overestimate means that the PQ contains less data than it can transmit or maybe even is empty whereas an underestimate means that the PQ contains more data than it can transmit.

FIG. 4 shows the comparison of PQ non-empty ratio of transmission time intervals (TTIs). The maxCQI scheduler has a higher probability of running empty than the RR scheduler. One of the reasons is that RR is fairer in the time domain than maxCQI. The PQT estimation algorithm is mainly based on metrics in the time domain.

FIGS. 3 and 4 clearly illustrates that different HSDPA schedulers have different FC performance. RR has least probability of empty PQ while worse in terms of cell throughput compared to maxCQI and proportional fairness (PF) schedulers. PF and maxCQI schedulers have a higher probability to overestimate the PQ. RR schedulers have a lower probability to run the PQ empty than maxPQI and PF schedulers. If the PQ runs empty the cell throughput will be decreased.

SUMMARY

Accordingly, one objective with embodiments of the present invention is to provide a method and an arrangement in a communication network node of achieving an optimal use of a scheduler buffer for a given user equipment communicating with said first communication network node, said communication network node comprising a flow control entity controlling the flow of data in respect of said given mobile terminal between a second communication network node and said first communication network node in a communication network system.

According to a first aspect of embodiments of the present invention this objective is achieved through a method as defined in the characterizing portion of claim 1, which specifies that the method comprises the step of providing, to a capability allocation message, used for controlling the flow of data in respect of said given mobile terminal between said second communication network node and said first communication network node in said communication network system, a first compensation factor based on at least one of: scheduling policy, mobility, load and radio channel type.

According to a second aspect of embodiments of the present invention this objective is achieved through an arrangement as defined in the characterizing portion of claim 9, which specifies that said flow control entity further being arranged to provide, to a capability allocation message, used for controlling the flow of data in respect of said given mobile terminal between said second communication network node and said first communication network node in said communication network system, a first compensation factor based on at least one of: scheduling policy, mobility, load and radio channel type Further embodiments are listed in the dependent claims.

Thanks to the provision of a method and a communication network node, which compensates the capability allocation message based on at least one of: scheduling policy, mobility, load and radio channel type, the probability that the scheduler buffer of said first communication network node will run empty is decreased. Also, the flow control performance in terms of cell throughput is improved. In addition to this the above compensation is simple to implement without altering the core part of commonly used flow control algorithms.

It also partially solves the problem of compensating for the congestion state in the air interface.

Further, the data delivery at the air interface of said first communication network node is expected to be improved as less data will be waiting for transmission in the scheduler buffer during a handover event.

Still other objects and features of embodiments of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

For a better understanding, reference is made to the following drawings and preferred embodiments of the invention. In the drawings, wherein like reference characters denote similar elements throughout the several views.

DETAILED DESCRIPTION

Figure 1:
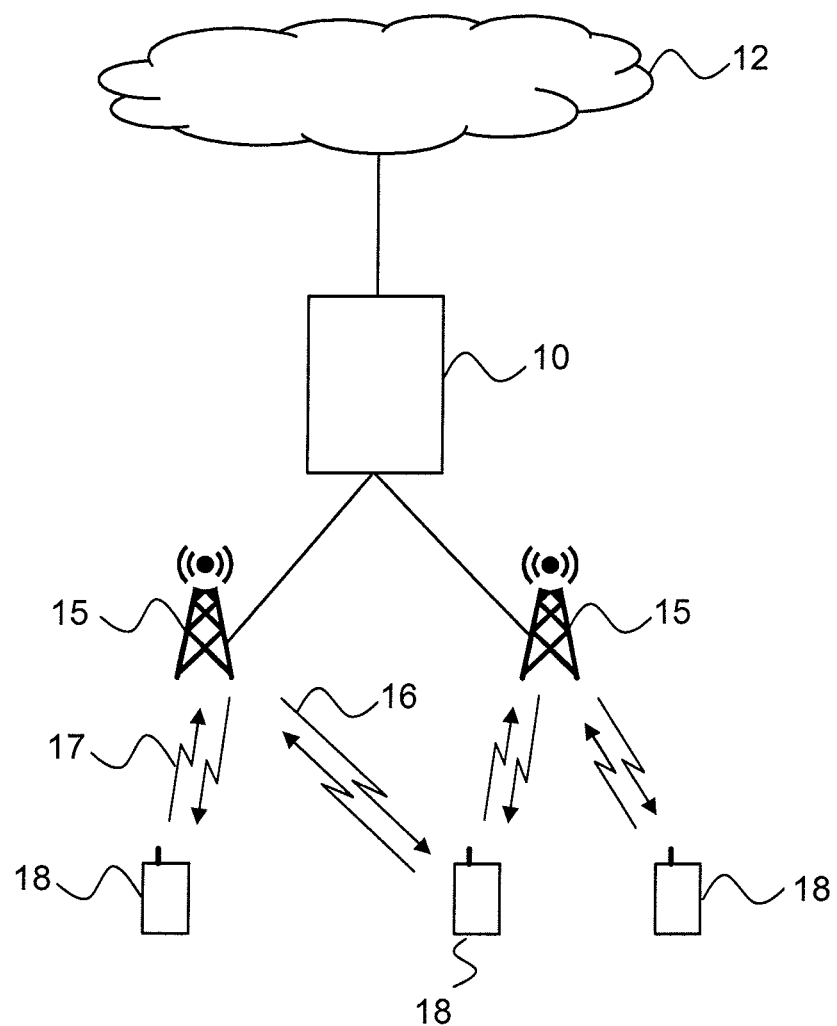
FIG. 1 shows a communication network architecture according to embodiments of the present invention.

FIG. 1 depicts a communication system including a radio access network (RAN), such as the UMTS terrestrial radio access network (UTRAN) architecture, comprising at least one radio base station (RBS) (eNodeB or NodeB) 15 (two are shown in FIG. 1) connected to one or more radio network controllers (RNCs) 10. The RAN is connected to a core network (CN) 12. The RAN and the CN 12 provide communication and control for a plurality of user equipments (UE) 18 that each uses downlink (DL) channels 16 and uplink (UL) channels 17. For the reason of clarity, only one uplink channel is denoted 17 and downlink channel denoted 16. On the downlink channel 16, the RBS 15 transmit to each user equipment 18 at a respective power level. On the uplink channel 17, the user equipments 18 transmit data to the RBS 15 at respective power levels.

According to a preferred embodiment of the present invention, the communication system is herein described as an HSDPA communication system. The skilled person, however, realizes that the inventive method and arrangement works very well on other communications systems as well, wherein a rate based or window-based congestion control is used where flows share the same bottleneck. The user equipments 18 may be mobile stations such as mobile telephones ("cellular" telephones) and laptop computers with mobile termination and thus may be, for example, portable, pocket, hand-held, computer-included, or car-mounted mobile devices which communicate voice and/or data with the RAN.

Figure 2:
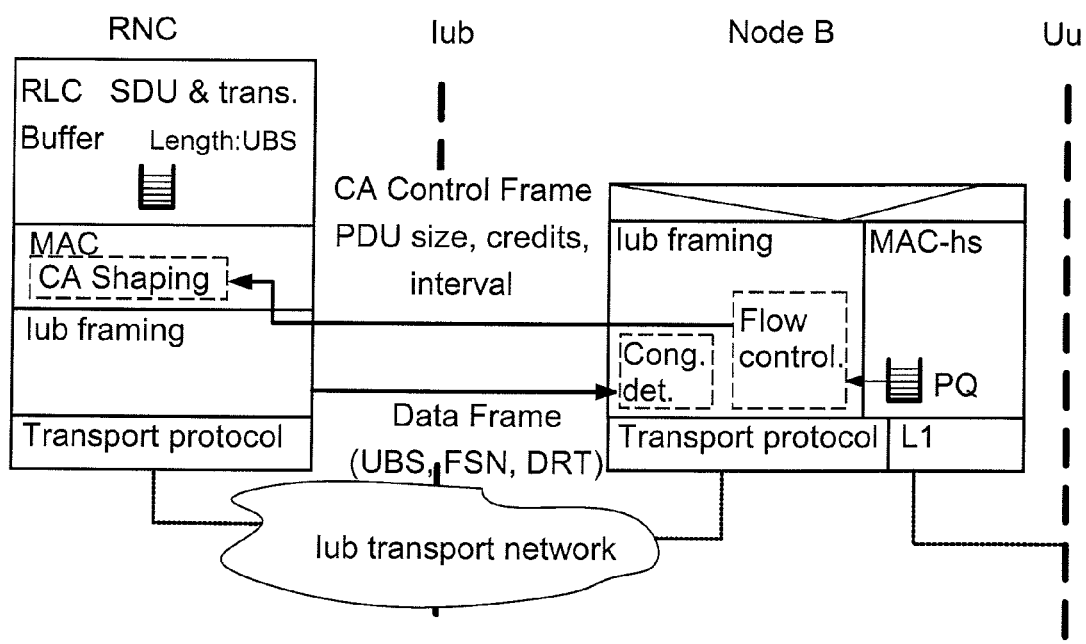
FIG. 2 shows the location of a flow control in the protocol stack.
Figure 3:
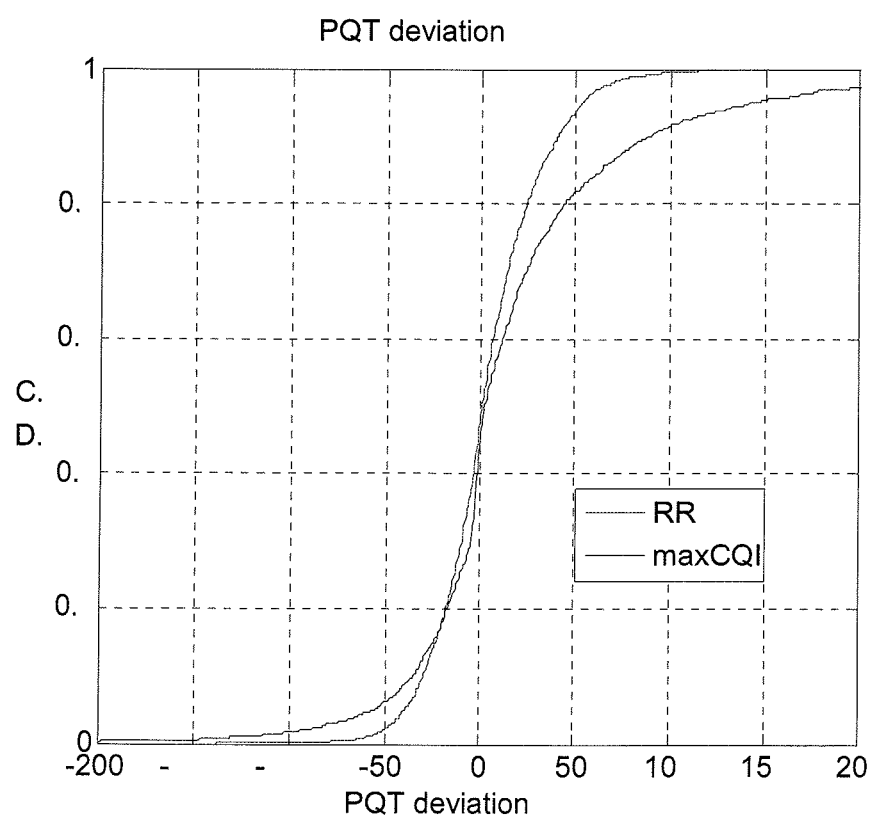
FIG. 3 shows a PQT deviation distribution.
Figure 4:
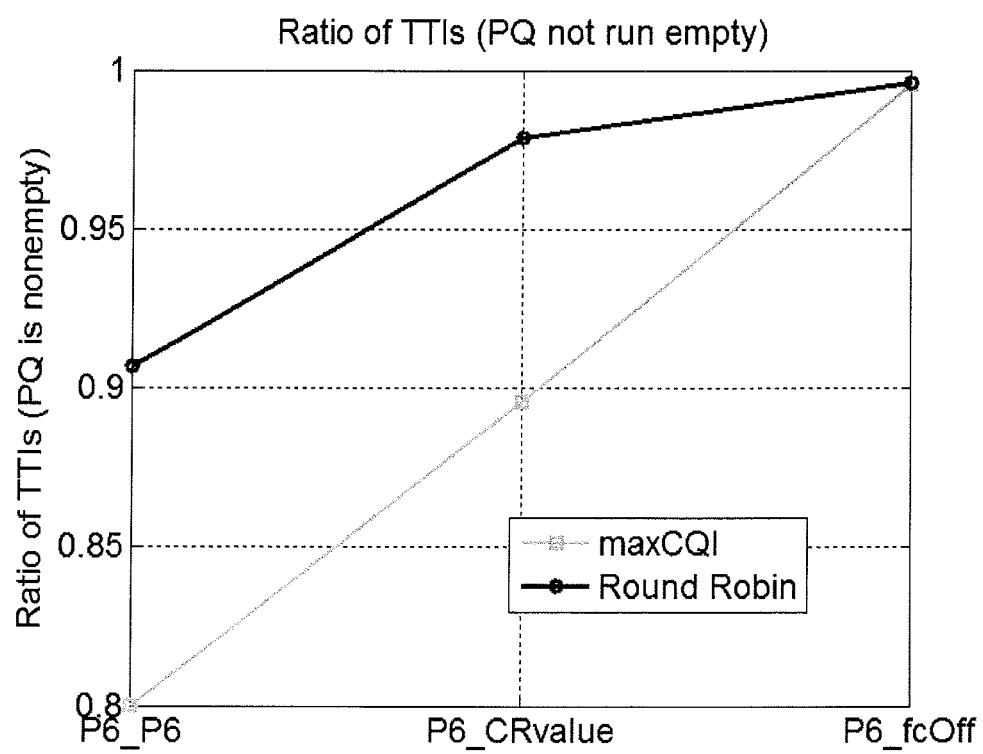
FIG. 4 shows the Ratio of TTIs (PQ not run empty)

The transport link between the RNC 10 and NodeB 15 is a potential bottleneck when its capacity is smaller than the available maximal capacity of the Uu interface. Vice versa, when the radio link 16, 17 between the NodeB 15 and the UE terminal 18 has smaller capacity than the TN link between the RNC 10 and NodeB 15, the Uu interface will be a bottleneck. In order to deal with either the transport network bottleneck or the air interface bottleneck, a flow control (FC) has been introduced. FIG. 2 shows the location of the FC in the protocol stack. The flow control operates per-flow basis, i.e. each HSDPA flow has its own control part(s).

According to embodiments of the present invention is proposed an idea which targets to improve the FC performance with the information on the scheduling policy and also the user mobility. This idea will not touch the FC core part as that would make the FC algorithm more complicated. The compensation will be done based on the measurement or historic statistics from different scheduling policies. In other words, as the maxCQI or PF scheduler results in a higher probability to overestimate the PQ than the RR scheduler, with this idea the compensation will be done to reduce the PQ overestimation. From time to time, the compensation factor may change based on the operator settings or the different measurement inputs.

Further, one of the design targets for the FC is to reduce the packet loss during the UE mobility. In situations with high mobility UEs the current FC entity has lower performance. The proposed idea also considers this situation. A corresponding compensation related to the UE mobility is done.

As a conclusion, the output from the FC algorithm, so called CA (capacity allocation) will be compensated considering the inputs from the scheduler and also the UE mobility measurements.

As both the FC entity and the scheduler entity are located at the NodeB side it is feasible for them to share information with each other. For the mobility measurements, it can be done at UE side or RNC side. In the NodeB it is also possible to measure the mobility, because the NodeB is also involved in the cell change procedure.

To implement embodiments of the present invention it is suggested is to compensate the CA allocation or PQT estimation (PQT estimation is an input to the FC entity), in order to decrease the probability of the PQ running empty.

A compensation factor is defined as below:

$$Compensation = f(\text{scheduling policy, mobility, load, radio channel type}) \quad (1)$$

1. Constant compensation factors may change from time to time, based on scheduling, mobility and radio channel type.
2. In high mobility cell or area, smaller compensation factors are defined.
3. In high loaded area, smaller compensation factors are defined.
4. For PF and maxCQI kind of schedulers, which have higher probability for running the PQ empty, larger compensation factors are defined in order to makes sure that the PQ does not run empty.
5. Different radio area/channels have different compensation factors.

Figure 5:
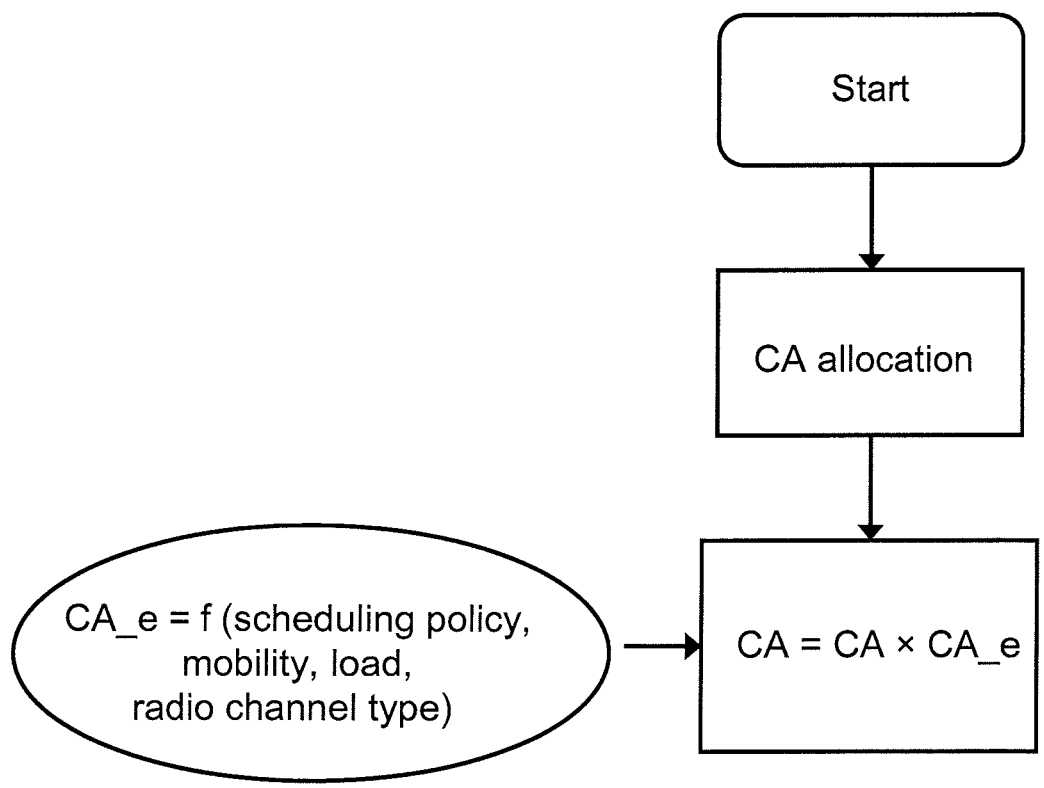
FIG. 5 shows a simplified flowchart of the inventive method according to embodiments of the present invention.
Figure 6:
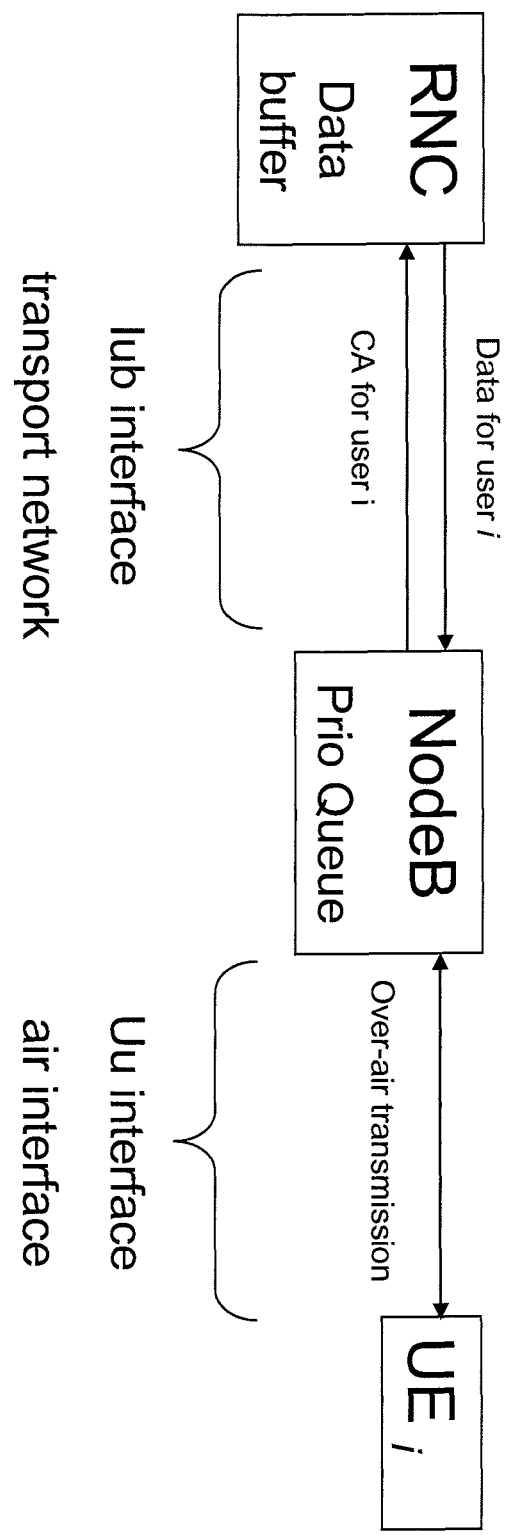
FIG. 6 is a simplified illustration of the inventive method as applied in a communication network system according to embodiments of the present invention.

The compensation can be done to the CA (capacity allocation) as illustrated in FIG. 5. CA is defined as a signalling message transmitted from NodeB to RNC requesting how much data should be transmitted in a later predefined period. The more accurate the CA allocation is, based on the available resource estimation both in the transport network interface (so called Iub interface) and the air interface (so called Uu interface), will guarantee the PQ to not run empty. If the PQ is overestimated, there will be less data in the PQ which reduces the data throughput over the Uu interface. Too much data in the PQ may result into unnecessary retransmission in the HARQ or RLC layer, and thus also degrade the data throughput. By Compensating the CA it is possible to reduce or remove these problems. The CA compensation is performed using a first compensation factor, herein designated $CA\_e$, as illustrated below:

$$CA = CA \times CA\_e \quad (2)$$

$CA\_e$ is calculated according the above equation (2). E.g. $CA\_e$—varies between e.g. 0.5 and 2.

If for example the scheduling polices is PF or maxCQI then $CA\_e > 1$ which then increases the CA allocation.

If for example the scheduling policy is RR, the first compensation factor is smaller than the other types of schedulers, such as PF or maxCQI.

The first compensation factor may of course be given any arbitrarily chosen designation other than $CA\_e$. Also, it is feasible that compensation may be performed through adding or subtracting a compensation factor from CA, or using any other appropriate mathematical relationship evident to the person skilled in the art.

PQT estimation is an input for the FC core entity. This metric can indicate congestion in the air interface. In other words, higher PQT means the less air resources are available, and smaller PQT means more air resources available. Exactly the same is done as done for CA compensation, PQT compensation is performed using a second compensation factor, herein designated $PQT\_e$, as illustrated below:

$$PQT = PQT \times PQT\_e \quad (3)$$

$PQT\_e$ is calculated according to the equation (3), E.g., $PQT\_e$ varies between e.g. 0.5 and 2.

For the scheduling policies, which have higher probability of having the PQ to run empty, define $PQT\_e$ as smaller values, for example, $PQT\_e < 1$.

Otherwise, define higher $PQT\_e$ values, for example, $PQT\_e > 1$, if PQ has too much data available for transmission.

For scheduling policies, which are much fairer in the time domain, like RR, they may have higher $PQT\_e$ values, for example, $PQT\_e > 1$.

The second compensation factor may of course be given any arbitrarily chosen designation other than $PQT\_e$. Also, it is feasible that compensation may be performed through adding or subtracting a compensation factor from PQT, or using any other appropriate mathematical relationship evident to the person skilled in the art.

DL RLC PDUs in the PQ at the source NodeB will be dropped as the user releases the connection between the UE and source NodeB during HO. With this idea of compensation the target is to keep the data delivery at source NodeB Iub interface at an even lower level. Hence, the idea includes a mobility consideration based on the UE mobility estimation, which is proposed below, UE Mobility Estimation Handover (HO) rate information based.

Global Positioning System (GPS) positioning based.

Radio Resource Control (RRC) state trace, or message trace, (when HO happens, there will be HO related signaling message exchanged between the UE and RNC) etc.

Measurements or historic statistics are input for the compensation process. If the mobility estimation is done at the NodeB side, statistics may be a good option. If the mobility estimation is performed at RNC or UE sides, such kind of information should be reported to NodeB via RRC message or other signaling message extension.

In the high mobility cells, compensation will be done to FC in order to keep PQ short enough.

The proposed compensation process will work combined with the FC entity at NodeB side. Normally, the FC entity may work in the time unit of hundred million seconds. At each working tick, FC entity output a (new) CA allocation, for example, if the congestion happens in the Iub interface or Uu interface. Taking the CA as an input, the compensation will be done like shown in FIG. 5.

CA_e is calculated dependent on all the factors discussed above. It may change from time to time, for example, changes per week or month or even per hours (busy hours and idle hours have different settings), or based on the operator preference.

Figure 7:
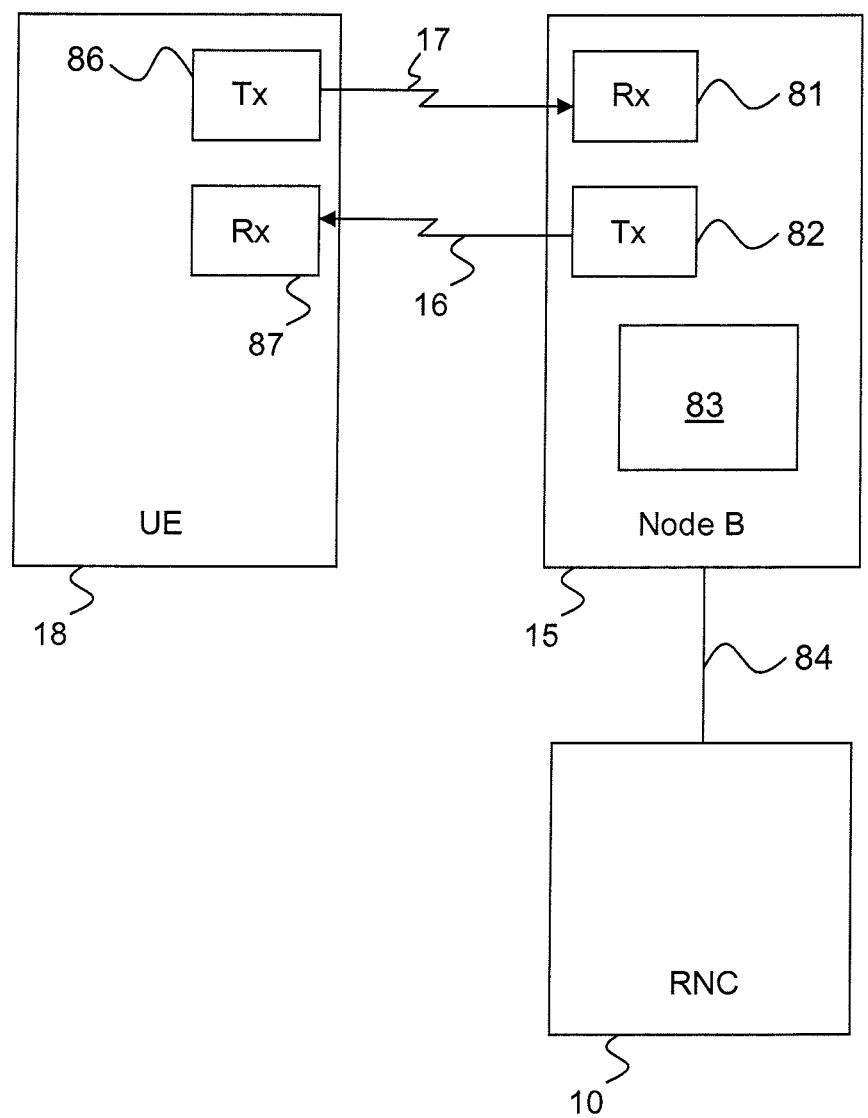
FIG. 7 shows a block diagram of an inventive communication network node communicating with a user equipment and another communication network node.

According to a general embodiment of the present invention, as illustrated in FIG. 7, a procedure for achieving an optimal use of a scheduler buffer PQ for a given user equipment $UE_i$ 18 communicating with said first communication network node (NodeB) 15, said communication network node 15 comprising a flow control entity 83 controlling the flow of data in respect of said given mobile terminal $UE_i$ 18 between a second communication network node (RNC) 10 and said first communication network node 15 in a communication network system, as shown in FIG. 5, is provided. The procedure comprises the step of:

providing, to a capability allocation message (CA), used for controlling the flow of data in respect of said given mobile terminal $UE_i$ 18 between said second communication network node (RNC) 10 and said first communication network node (NodeB) 15 in said communication network system, a first compensation factor (CA_e) based on at least one of: scheduling policy, mobility, load and radio channel type.

According to some embodiments, the method further comprises the step of determining said compensated capability allocation CA through multiplying a previous capability allocation with said first compensation factor, e.g. CA=CA× CA_e. Said first compensation factor (CA_e) may normally vary between 0.5 and 2, but may also take values outside that range.

According to some embodiments, the method further comprises the step of setting said first compensation factor as >1 (i.e. CA_e>1) for scheduling polices such as PF scheduling or maxCQI scheduling and said first compensation factor (CA_e) as smaller than for scheduling polices such as PF scheduling or maxCQI scheduling for scheduling polices such as RR.

According to some embodiments, the method further comprises the step of providing, to a an input PQT to said flow control entity 83 of said first communication network node 15 a second compensation factor based on at least one of: scheduling policy, mobility, load and radio channel type.

According to some embodiments, the method further comprises the step of determining said compensated input PQT to said flow control entity 83 through multiplying a previous PQT with said second compensation factor, e.g. PQT=PQT× PQT_e. Said second compensation factor (PQT_e) may vary between 0.5 and 2, but may also take values outside that range.

According to some embodiments, the method further comprises the step of determining said second compensation factor as <1 (i.e. PQT_e<1) for the scheduling policies having a high probability of having the PQ to run empty, such as PF scheduling or maxCQI scheduling, and otherwise as >1 (i.e. PQT_e>1), if the PQ has too much data available for transmission and also for scheduling policies which are much fairer in the time domain, such as RR scheduling.

According to some embodiments, the method further comprises the step of including into said first compensation factor (CA_e) a mobility consideration based on a UE mobility estimation taking into account at least one of: HO rate information, GPS positioning, RRC state trace, message trace, measurements and statistics available in the communication network system.

According to some embodiments, the method further comprises the step of including into said second compensation factor (PQT_e) a mobility consideration based on a UE mobility estimation taking into account at least one of: HO rate information, GPS positioning, RRC state trace, message trace, measurements and statistics available in the communication network system.

FIG. 7 is a block diagram showing a user equipment 18 and a first communication network node 15, such as NodeB, and a second communication network node 10, such as the RNC, for achieving an optimal an optimal use of a scheduler buffer for a given user equipment $UE_i$ 18 communicating with said first communication network node 15, said communication network node 15 comprising a flow control entity 83 controlling the flow of data in respect of said given mobile terminal $UE_i$ 18 between said second communication network node 10 and said first communication network node 15 in a communication network system.

The NodeB 15 comprises a transmitting unit 82 including a radio transmitter. The NodeB 15 further comprises a receiving unit 81 including a receiver. The transmitter 82 is transmitting data to a receiver 87 of the user equipment 18 over a radio interface on the downlink channel 16. The receiver 81 is receiving data from the user equipment 18 on the uplink channel 17. NodeB 15 further comprises a flow control entity 83 adapted to control the flow of data in respect of said given mobile terminal $UE_i$ 18 between said second communication network node 10 and said first communication network node 15 in said communication network system. Said flow control entity 83 is further arranged to provide, to a capability allocation message (CA), used for controlling the flow of data in respect of said given mobile terminal $UE_i$ 18 between said second communication network node 10 and said first communication network node 15 in said communication network system, a first compensation factor (CA_e) based on at least one of: scheduling policy, mobility, load and radio channel type.

The user equipment 18 comprises a transmitting unit 86 including a radio transmitter. The radio transmitter 86 is arranged to transmit data packets to the receiver 81 of the NodeB 15 over the radio interface on the uplink channel 17. The UE 18 further comprises a receiving unit 87 including a receiver. The receiver 87 is arranged to receive data packets transmitted from the transmitter 82 of the NodeB 15 on the downlink channel 16.

According to some embodiments, said flow control entity 83 is further arranged to determine said compensated capability allocation CA through multiplying a previous capability allocation with said first compensation factor, e.g. CA=CA×CA_e. Said first compensation factor (CA_e) may vary between 0.5 and 2, but may also take values outside that range.

According to some embodiments, said flow control entity 83 is further arranged to set said first compensation factor as >1 (i.e. CA_e>1) for scheduling polices such as PF scheduling or maxCQI scheduling and said first compensation factor (CA_e) as smaller than for scheduling polices such as PF scheduling or maxCQI scheduling for scheduling polices such as RR.

According to some embodiments, said flow control entity 83 is further arranged to provide, to a an input PQT to said flow control entity 83 of said first communication network node 15 a second compensation factor (PQT_e) based on at least one of: scheduling policy, mobility, load and radio channel type.

According to some embodiments, said flow control entity 83 is further arranged to determine said compensated input PQT to said flow control entity 83 through multiplying a previous PQT with said second compensation factor, e.g. PQT=PQT×PQT_e. Said second compensation factor (PQT_e) may vary between 0.5 and 2, but may also take values outside that range.

According to some embodiments, said flow control entity 83 is further arranged to determine said second compensation factor as <1, (i.e. PQT_e<1) for the scheduling policies having a high probability of having the PQ to run empty, such as PF scheduling or maxCQI scheduling, and otherwise as >1 (i.e. PQT_e>1), if the PQ has too much data available for transmission and also for scheduling policies which are much fairer in the time domain, such as RR scheduling.

According to some embodiments, said flow control entity 83 is further arranged to include into said first compensation factor (CA_e) a mobility consideration based on a UE mobility estimation taking into account at least one of: HO rate information, GPS positioning, RRC state trace, message trace, measurements and statistics available in the communication network system.

According to some embodiments, said flow control entity 83 is further arranged to include into said second compensation factor (PQT_e) a mobility consideration based on a UE mobility estimation taking into account at least one of: HO rate information, GPS positioning, RRC state trace, message trace, measurements and statistics available in the communication network system.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

Expressions such as "including", "comprising", "incorporating", "consisting of", "have", "is" used to describe and claim embodiments of the present invention are intended to be construed in a non-exclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

The invention claimed is:

1. A method in a first communication network node that uses a scheduler buffer for a given user equipment communicating with said first communication network node, said first communication network node comprising a flow control entity, the method comprising the steps of:
controlling by the flow control entity the flow of data in respect of a given mobile terminal between a second communication network node and said first communication network node in a communication network system;
generating a capability allocation message, used for controlling the flow of data in respect of said given mobile terminal between said second communication network node and said first communication network node in said communication network system, based on a first compensation factor that is determined based on at least one of: scheduling policy, mobility, load and radio channel type; and
setting said first compensation factor as a value greater than 1 when using scheduling polices configured as proportional fairness (PF) scheduling or maximum Channel Quality Indicator (maxCQI) scheduling to control the flow of data for the given mobile terminal, and setting said first compensation factor as a value smaller than 1 when using scheduling polices configured as Round Robin (RR) scheduling,
wherein generating the capability allocation message comprises determining a previous value of a capability allocation and multiplying the previous value of the capability allocation with said first compensation factor.

2. A method according to claim 1, further comprising the step of determining said first compensation factor in response to a mobility consideration based on a User Equipment (UE) mobility estimation taking into account at least one of: Handover (HO) rate information, Global Positioning System (GPS) positioning, Radio Resource Control (RRC) state trace, message trace, measurements and statistics available in the communication network system.

3. A method in a first communication network node that uses a scheduler buffer for a given user equipment communicating with said first communication network node, said first communication network node comprising a flow control entity, the method comprising the steps of:
controlling by the flow control entity the flow of data in respect of a given mobile terminal between a second communication network node and said first communication network node in a communication network system;
generating a capability allocation message, used for controlling the flow of data in respect of said given mobile terminal between said second communication network node and said first communication network node in said communication network system, based on a first compensation factor that is determined based on at least one of: scheduling policy, mobility, load and radio channel type;
providing, to an input Priority Queue Time (PQT) to said flow control entity of said first communication network node, a second compensation factor that is determined based on at least one of: scheduling policy, mobility, load and radio channel type; and
determining said second compensation factor as a value less than 1 when using scheduling policies as configured as PF scheduling or maxCQI scheduling to control the flow of data for the given mobile terminal, and otherwise determining said second compensation factor as a value greater than 1, when the Priority Queue (PQ) has too much data available for transmission and also for scheduling policies configured as RR scheduling to control the flow of data for the given mobile terminal.

4. A method according to claim 3, further comprising the step of determining said input PQT to said flow control entity by multiplying a previous input PQT with said second compensation factor.

5. A method according to claim 3, further comprising determining said second compensation factor in response to a mobility consideration based on a UE mobility estimation taking into account at least one of: Handover (HO) rate information, Global Positioning System (GPS) positioning, Radio Resource Control (RRC) state trace, message trace, measurements and statistics available in the communication network system.

6. A first communication network node that uses a scheduler buffer for a given user equipment communicating with said first communication network node, said first communication network node comprising:
 a flow control entity, wherein the flow controlling entity:
  controls a flow of data in respect of a given mobile terminal between a second communication network node and said first communication network node in a communication network system;
  generates a capability allocation message, used for controlling the flow of data in respect of said given mobile terminal between said second communication network node and said first communication network node in said communication network system, based on a first compensation factor that is determined based on at least one of: scheduling policy, mobility, load and radio channel type; and
  sets said first compensation factor as a value greater than 1 when using scheduling polices configured as proportional fairness (PF) scheduling or maximum Channel Quality Indicator (maxCQI) scheduling to control the flow of data for the given mobile terminal, and setting said first compensation factor as a value smaller than 1 when using scheduling polices configured as Round Robin (RR) scheduling.

7. A first communication network node according to claim 6, wherein said flow control entity determines said capability allocation message by multiplying a previous value of a capability allocation with said first compensation factor.

8. A first communication network node according to claim 6, wherein said flow control entity is further arranged to determine said first compensation factor in response to a mobility consideration based on a UE mobility estimation taking into account at least one of: Handover (HO) rate information, Global Positioning System (GPS) positioning, Radio Resource Control (RRC) state trace, message trace, measurements and statistics available in the communication network system.

9. A first communication network node that uses a scheduler buffer for a given user equipment communicating with said first communication network node, said first communication network node comprising:
 a flow control entity, wherein the flow controlling entity:
  controls a flow of data in respect of a given mobile terminal between a second communication network node and said first communication network node in a communication network system;
  generates a capability allocation message, used for controlling the flow of data in respect of said given mobile terminal between said second communication network node and said first communication network node in said communication network system, based on a first compensation factor that is determined based on at least one of: scheduling policy, mobility, load and radio channel type; and
  provides, to an input Priority Queue Time (PQT) to said flow control entity of said first communication network node, a second compensation factor that is determined based on at least one of: scheduling policy, mobility, load and radio channel type,
 wherein said flow control entity is further arranged to determine said second compensation factor as a value less than 1 when using scheduling policies configured as PF scheduling or maxCQI scheduling to control the flow of data for the given mobile terminal, and otherwise determining said second compensation factor as a value greater than 1, when a Priority Queue (PQ) has too much data available for transmission and also for scheduling policies configured as User Equipment (UE) scheduling to control the flow of data for the given mobile terminal.

10. A first communication network node according to claim 9, wherein said flow control entity is further arranged to determine said input PQT to said flow control entity by multiplying a previous input PQT with said second compensation factor.

11. A first communication network node according to claim 9, wherein said flow control entity is further arranged to determine said second compensation factor in response to a mobility consideration based on a UE mobility estimation taking into account at least one of: Handover (HO) rate information, Global Positioning System (GPS) positioning, Radio Resource Control (RRC) state trace, message trace, measurements and statistics available in the communication network system.

* * * * *

UNITED STATES PATENT AND TRADEMARK OFFICE
CERTIFICATE OF CORRECTION

PATENT NO. : 8,854,970 B2  
APPLICATION NO. : 13/576125  
DATED : October 7, 2014  
INVENTOR(S) : Ericson et al.

It is certified that error appears in the above-identified patent and that said Letters Patent is hereby corrected as shown below:

On the title page, item (57), under "ABSTRACT", in Column 2, Line 13, delete "compensation" and insert -- communication --, therefor.

Specification

In Column 1, Line 34, delete "smaller then" and insert -- smaller than --, therefor.

In Column 2, Line 56, delete "is to" and insert -- is too --, therefor.

In Column 3, Line 18, delete "maxPQI" and insert -- maxCQI --, therefor.

Signed and Sealed this  
Twenty-seventh Day of October, 2015

Michelle K. Lee  
*Director of the United States Patent and Trademark Office*